United States Patent [19]

D'Amelia et al.

[11] Patent Number: 5,115,017
[45] Date of Patent: May 19, 1992

[54] POLYVINYL OLEATE AS A FAT REPLACEMENT

[75] Inventors: Ronald P. D'Amelia, Hicksville, N.Y.; Peter T. Jacklin, Lafayette, N.J.

[73] Assignee: Nabisco Brands, Inc., Parsippany, N.J.

[21] Appl. No.: 446,220

[22] Filed: Dec. 5, 1989

Related U.S. Application Data

[62] Division of Ser. No. 312,618, Feb. 17, 1989, Pat. No. 4,915,974.

[51] Int. Cl.$^5$ .............. C08G 68/78; A23L 1/307; A23D 9/00
[52] U.S. Cl. .............. 525/59; 426/611; 426/612; 426/804
[58] Field of Search .......... 525/59

[56] References Cited

U.S. PATENT DOCUMENTS

| | | | |
|---|---|---|---|
| 2,601,561 | 6/1952 | Schertz | 260/23 |
| 3,637,774 | 1/1972 | Babayan et al. | 260/410.6 |
| 3,876,794 | 4/1975 | Rennhard | 426/152 |
| 3,944,680 | 3/1976 | van Pelt et al. | 426/564 |
| 3,962,465 | 6/1976 | Richter et al. | 426/48 |
| 3,968,169 | 7/1976 | Seiden et al. | 260/615 R |
| 3,986,890 | 10/1976 | Richter et al. | 127/38 |
| 4,046,874 | 9/1977 | Gabby et al. | 424/73 |
| 4,247,568 | 1/1981 | Carrington et al. | 426/321 |
| 4,304,768 | 12/1981 | Staub et al. | 424/180 |
| 4,504,509 | 3/1985 | Bell et al. | 426/549 |
| 4,510,166 | 4/1985 | Lenchin et al. | 426/565 |
| 4,597,963 | 7/1986 | Deckmer | 424/59 |
| 4,608,265 | 8/1986 | Zwiercan et al. | 426/582 |
| 4,626,441 | 12/1986 | Wolkstein | 426/548 |
| 4,631,196 | 12/1986 | Zeller | 426/580 |
| 4,678,672 | 7/1987 | Dartey et al. | 426/19 |
| 4,695,475 | 9/1987 | Zwiercan et al. | 426/582 |

FOREIGN PATENT DOCUMENTS

| | | |
|---|---|---|
| 0235836 | 9/1987 | European Pat. Off. |
| 0236288 | 9/1987 | European Pat. Off. |
| 48-6195 | 2/1973 | Japan |

OTHER PUBLICATIONS

A. E. Rheineck, J. Am. Oil Chem. Soc. 28, 456–459, 1951.
E. W. Eckey, R. O. Anderson, and R. J. Woestman, J. Am. Oil Chem. Soc. 32, 185–191, 1955.
A. E. Rheineck, N. J. Monson, and W. L. Lantz, J. Am. Oil Chem. Soc. 39, 450–457, 1962.
R. S. Balakrishna, H. Dakshinamurthy and J. S. Aggarwal Paintindia 16, 20–22, 1967.
Seymour and Carraher, Polymer Chemistry, Marcel Dekker, 1988, pp. 313–352.
Weiss et al., J. Am. Oil. Chem. Soc. 48, 145–148 (1971).
Scientific Polymer Products, Inc., catalogue p. 24.
Hamm, Food Sci. 49 419–428 (1984).
Haumann J. Am. Oil Chem. Soc. 63, 278–287 (1986).
Leeds, Polyvinyl Alcohol, 21 Kirk Othmer Enc. Tech. 2d ed. 1970, pp. 353–368.
Bracco. E. F., et al., 46 Am. J. Clin. Nutr. 784–789 (1987).
Dunn, 1980 Chem & Ind, 801–806.
Babayan et al., 41 J. Am. Oil Chem. Soc., 434–437 (1963).
Bailey's Industrial Oil and Fat Products, 4th ed., Wiley, New York, 1979, vol. 1, pp. 716–717, 742–747, 812–813.

Primary Examiner—Joseph L. Schofer
Assistant Examiner—Wu C. Cheng
Attorney, Agent, or Firm—Stephen B. Shear

[57] ABSTRACT

Polyvinyl alcohol fatty acid esters, notably unsaturated acid esters, comprise a new class of edible fat replacements. Polyvinyl oleate, prepared either by direct esterification of low molecular weight polyvinyl alcohol with oleic acid, oleic anhydride or oleyl chloride, by the transesterification between low molecular weight polyvinyl alcohol and methyl oleate, or by the interesterification between low molecular weight polyvinyl acetate and methyl oleate, is a preferred edible fat replacement.

32 Claims, No Drawings

POLYVINYL OLEATE AS A FAT REPLACEMENT

This is a divisional of copending application Ser. No. 07/312,618 filed on Feb. 17, 1989, now U.S. Pat. No. 4,915,974 issued Apr. 10, 1990.

BACKGROUND OF THE INVENTION

This invention relates to the use of polyvinyl alcohol fatty acid esters, notably unsaturated fatty acid esters, as fat replacements in food and pharmaceuticals. Polyvinyl oleate is a preferred compound in this new class of edible fat replacements.

Since fats provide nine calories per gram compared to four calories per gram provided by protein or carbohydrates, major research efforts toward reduction of caloric intake for medical or health reasons have focused on ways to produce food substances that provide the same functional and organoleptic properties as fats, but not the calories. Analogues of natural triglyceride fat, sugar fatty acid polyesters and similar derivatives of other polyhydric compounds, neopentyl alcohol esters, esters of di- and tri-carboxylic acids, jojoba oil, silicone oils and various polysaccharides have been suggested for use as edible fat replacements. (For recent reviews, see Hamm, D. J., 49 Food Sci. 419 (1984), and Haumann, B. F., 63 J. Amer. Oil Chem. Soc. 278 (1986).)

In the selection, modification, and/or synthesis of low calorie replacements of edible fats and oils, the polymeric fat replacements, for example, polysaccharides, have a great deal of structural flexibility because of the inherent nature of polymers. Not only may side chain fatty substituents attached to a chemical structure be varied to achieve different chemical and physical properties (as was the case, for example, with the hydrogenated, partially hydrogenated and unhydrogenated fatty acids condensed with sucrose in Eur. Pat. Ap. No. 235,836 to Bodor and Page and in Eur. Pat. Ap. No. 236,288 to Bernhardt to make different sucrose polyesters), but the entire structure may be shortened or lengthened to make macromolecules of enormously differing functionality.

A number of branched and linear polysaccharides and lower molecular weight dextrins and amyloses have been suggested as fat replacements in foods. Polydextrose, a tasteless non-sweet low calorie bulking agent formed by the random polymerization of glucose with lesser amounts of sorbitol and citric acid, has been used as a partial replacement for fat (and sugar) in a variety of common processed foods, including desserts (U.S. Pat. No. 4,626,441), dairy products (U.S. Pat. No. 4,631,196), and crackers (U.S. Pat. No. 4,678,672). Polyglucoses and polymaltoses, prepared by the polycondensation of saccharides in the presence of a polycarboxylic acid catalyst, were synthesized and used in dietetic foods in U.S. Pat. No. 3,876,794 to Rennhard and combined with dietary fiber in U.S. Pat. No. 4,304,768 to Staub et al.

Converted starches (mostly from tapioca, corn, and potato starches), prepared by the chemical, thermal, or enzymatic degradation of starch molecules to lower molecular weight fragments (including dextrins and amyloses), were disclosed as fat- or oil-replacements in foodstuffs in U.S. Pat. Nos. 3,962,465 and 3,986,890 to Richter et al., U.S. Pat. No. 4,247,568 to Carrington and Haleck, and U.S. Pat. No. 4,510,166 to Lenchin et al. Modified high amylose starches have been employed as fat extenders in imitation cheeses (U.S. Pat. No. 4,504,509, U.S. Pat. No. 4,608,265, and U.S. Pat. No. 4,695,475) and in batter coatings for baked food products that resemble fried foods (U.S. Pat. No. 4,504,509). An anionic polysaccharide obtained from algae was disclosed with mono and/or disaccharides to extend fats in whippable emulsions in U.S. Pat. No. 3,944,680 to van Pelt et al.

Polyglycerol esters comprise another class of polymeric fat replacements. Widely used as emulsifiers, polyglycerol fatty esters are wax-like solids which may be used with hydrophilic colloids to form compositions oleaginous in appearance and texture, but containing substantially no fat. Linear and cyclic polyglycerols of different chain lengths have been prepared for consumption in food (U.S. Pat. No. 3,968,169), and substituted with a range of fatty acid residues (U.S. Pat. No. 3,637,774) for use in margarine, imitation butter, cheese spreads, dips, puddings, icings, salad dressings, sauces, and frozen desserts, including ice cream and sherbet (U.S. Pat. Nos. 3,637,774 and 4,046,874).

Though great variations in chain length and structure are possible with the currently available polymeric fat substitutes, most have the disadvantage of being at least partially, if not totally, digestible. (See Haumann, supra, pp. 278-280, for a discussion of polysaccharides, and Babayan, V. K., 41 J. Amer. Oil Chem. Soc. 434 (1963), for polyglycerol esters.) In addition, polymerization reactions are hard to control. The direct free radical polymerization of vinyl esters of unsaturated fatty acids, for example, do not form linear polymers, but polycondense to form cross-linked products (Seymour, R. B., and Carraher, C. E., Polymer Chemistry, Marcel Dekker, New York, 1988, chapter 9).

By the same token, degradation reactions are hard to control. Thus, close attention must be made to the conditions under which starches are degraded to form dextrins and sugars (U.S. Pat. No. 4,510,166). Homogeneous products are difficult to achieve, and vary greatly with the starting material used. Even if the starting material were a pure compound, which most natural products are not, the sugar moieties making up polysaccharide chains have myriad functional groups that can react, and geometric and optical isomerism further complicates condensation reactions. (In the esterification of a single sucrose molecule with an excess of fatty acid, for instance, the eight hydroxyl groups can react to form 255 different sucrose esters if all isomers are counted; see Weiss, T. J. et al., 48 J. Amer. Oil Chem Soc. 145 (1971).)

SUMMARY OF THE INVENTION

An objective of the present invention is to provide a simple polymeric fat replacement for food compositions which is free from the above-described disadvantages. Heterogeneity problems resulting from the polymerization or degradation of polysaccharides and polyglycerols to form complex mixtures of macromolecules are avoided by using a simple polymeric backbone to which fatty substituents can be attached. Synthetic fats with the different properties (rheology, viscosity, and so forth) needed for different culinary applications can be formulated by varying the degree of substitution and the chain length of the polymer.

It has now been found that relatively low molecular weight polyvinyl alcohol esterified with fatty acids can be used as an edible fat replacement for part or all of the fat in food compositions. More particularly, it has been found that unsaturated fatty acid esters of polyvinyl alcohol are especially useful as fat replacements in food, and that polyvinyl oleate is a preferred compound.

DETAILED DESCRIPTION OF THE INVENTION

Polyvinyl alcohol ($-CH_2-CHOH-$)$_n$ is apparently the simplest possible water-soluble polymer. (See recent reviews in Dunn, A. S., 1980 Chem. & Ind. (London), 801-806 and Leeds, M., in the Kirk-Othmer Encyclopedia of Chemical Technology, 2nd ed., vol. 21, Wiley-Interscience, New York, 1970, pp. 353-368.) Most of its uses involve extrusion of the resin or its application as a surface coating. It has been employed in films, adhesives and binders, and in the treatment of textiles and paper.

Polyvinyl alcohol undergoes chemical reactions very similar to those of low molecular weight aliphatic alcohols. For example, it reacts with acid chlorides or anhydrides to form esters. In many instances, it is possible to obtain a completely new resin by reacting all of the hydroxyl groups. Even with lesser degrees of substitution, the properties of the resin may be considerably altered, while retaining, if desired, the water solubility. Further interesting property variations can be achieved by using partially hydrolyzed polyvinyl alcohol or by varying the chain length of the polymer.

Polymeric synthetic drying "oils" for use in the surface coatings industry can be prepared by reaction of polyvinyl alcohol with long chain unsaturated fatty acids (Leeds, M., supra at 358). Polyvinyl oleate was among the polyvinyl alcohol esters synthesized for this use (U.S. Pat. No. 2,601,561 to Schertz; Rheineck, A. E., 28 J. Am. Oil Chem. Soc. 456 (1951); and Balakrishna, R. S. et al., 16 Paint-india 20 (1967)). However, among the esters made, polyvinyl oleate was a poor drying oil. When used in a varnish, it did not exhibit desirable properties, e.g., it did not develop early hardness (Rheineck, A. E., supra at 458). A film of the ester took a long time drying, and even then remained tacky after two months (Balakrishna, et al., supra at 21).

The polyvinyl alcohols used to make these unsuccessful polyvinyl oleate synthetic drying oils were, relatively, medium chain length resins. M. Leeds gives molecular weights of parent polyvinyl acetates as ranging from 10,000 to 400,000 (Table 3, supra at 356). In the examples of U.S. Pat. No. 2,601,561, the polymeric alcohols employed were molecular weight 14,000 (Examples I-VI and VIII) or 52,000 (Example VII). R. S. Balakrishna, et al. used polyvinyl alcohol having a molecular weight 30,000 to 35,000 (supra at 20).

In the practice of the present invention, on the other hand, a considerably lower molecular weight polyvinyl alcohol is esterified with fatty acids, preferably unsaturated fatty acids such as oleic acid, to use as an edible fat replacement. The polymeric size will range between molecular weight 500 and 8000, preferably between 1000 and 5000.

The term "polyvinyl alcohol" as used herein refers to a polymer prepared from polyvinyl acetate by replacement of the acetates with hydroxyl groups, and may contain residual acetyl groups. In the practice of this invention, some residual acetyl groups are preferred. In general, polyvinyl alcohol acetylated to 25% esterification is preferred over polyvinyl alcohol substantially free of acetyl groups.

The term "fatty acids" used here means organic fatty acids containing four to thirty carbons, and may be synthetic or natural, saturated or unsaturated, with straight or branched chains. Preferred fatty acids have from 10 to 22 carbons. Examples of fatty acids that can be used in this invention are butyric, caproic, caprylic, pelargonic, capric, lauric, myristic, palmitic, stearic, arachidic, behenic, oleic, linoleic, linolenic, eleostearic, and arachidonic acids. Mixtures of fatty acids may also be used, such as those obtained from non-hydrogenated or hydrogenated soybean, safflower, sunflower, sesame, peanut, corn, olive, rice bran, canola, babassu nut, coconut, palm kernel, cottonseed, or palm oils.

In this invention, unsaturated fatty acids are preferred. The term "unsaturated fatty acid" as used here means any unsaturated fatty acid containing at least 8, and preferably from 14 to 22, carbon atoms. The unsaturated fatty acids must contain at least one alkene linkage and may contain two or more alkene groups in any position in the hydrocarbon chain, and the unsaturation may or may not be present as a conjugated system of double bonds. A suitable acid for this purpose is oleic acid. Alternatively, mixtures containing oleic and/or other unsaturated acids, such as that obtained from cottonseed, peanut, olive, palm, sunflower, sesame, safflower, rice bran, soybean, or corn oil may be used.

The term "fatty acid derivative" as used herein means a derivative other than an ester, for example, a fatty acid, a fatty acid chloride, or a fatty acid anhydride.

The term "fatty acid ester" as used herein means the methyl, ethyl, propyl, butyl, or pentyl ester of a fatty acid, and any geometric or optical isomer thereof. In the preferred embodiment, the methyl or ethyl ester of an unsaturated fatty acid is used.

A solvent may be employed. The term "solvent" used in the description and claims means any material that is liquid at the synthesis reaction temperature and pressure and will dissolve, suspend or hold the reactants in the reaction mixture in an amount effective to expedite contact for the desired esterification, interesterification or transesterification to occur.

In the practice of the present invention, polyvinyl alcohol may be condensed with a fatty acid, a fatty acid chloride, or a fatty acid anhydride; in the preferred embodiment, the fatty acid or fatty acid derivative is unsaturated. The total amount of fatty acid, acid chloride, or anhydride present in the reaction mixture can be a maximum that theoretically will react to completely esterify all the free hydroxyls of the polyvinyl alcohol. Thus, the total amount of fatty acid or acid chloride or anhydride present will be one mole for each mole of free hydroxyl moieties available on the polyvinyl alcohol reactant. However, best results are achieved by using an excess of fatty acid, acid chloride or anhydride. Typically, a thirty percent excess is employed.

In an alternate practice of the present invention, polyvinyl alcohol may be transesterified with a fatty acid ester, preferably an unsaturated fatty acid ester. Theoretically, the total amount of fatty acid ester present in the reaction mixture can be a maximum that theoretically will react to completely transesterify all the hydroxyls of the polyvinyl alcohol reactant. However, best results are achieved by using an excess of fatty acid ester over the theoretical stoichoimetric amount required. Typically, a fifteen percent excess is used.

In another alternate practice of the present invention, polyvinyl acetate may be interesterified with a fatty acid ester, preferably an unsaturated fatty acid ester. Theoretically, the total amount of fatty acid ester present in the reaction mixture can be a maximum that will react to completely interesterify all the acetate groups of the polyvinyl reactant.

The transesterification and interesterification reactions are carried out in the presence of a catalyst, such as, for example, sodium. A sodium/potassium alloy can also be used.

According to a preferred embodiment of the present invention, the polyvinyl alcohol is dissolved in the fatty acid, the acid chloride, or anhydride. Alternatively, the polyvinyl acetate is dissolved in the fatty acid ester and a catalyst is added to the mixture. The reaction mixture in either case may be warmed at reflux and stirred to speed the reaction. The length of reaction time varies with the reaction conditions and may require several hours.

The polyvinyl esters of this invention may be incorporated either alone, or in combination with another fat and/or fat mimetic, into any food composition or used in conjunction with any edible material. The term "edible material" is broad and includes anything edible. Representative of edible materials which can contain the polyvinyl esters of this invention in full or partial replacement of natural fat are: frozen desserts, e.g., sherbet, ice cream, ices, or milk shakes; puddings and pie fillings; margarine substitutes or blends; flavored bread or biscuit spreads; mayonnaise; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as those containing peanut butter or chocolate; chewing gum; bakery products, e.g., cakes, breads, rolls, pastries, cookies, biscuits, and savory crackers; mixes or ingredient premixes for any of these; as well as flavor, nutrient, drug or functional additive delivery systems.

EXAMPLES

The following examples detail three methods of preparing polyvinyl fatty acid esters in accordance with the present invention, an in vitro screening test for lipase digestibility of the compounds, and some compound uses in food compositions. It is to be understood that these examples are merely illustrative and are not to be construed as being limitative. In the chemical syntheses, the biochemical screenings, and the food composition recipes, all percentages given are weight percentages, and are based on the weight at the particular stage of processing described.

EXAMPLE 1

Polyvinyl oleate for use in food compositions is synthesized from polyvinyl alcohol in this example.

A reaction flask is charged with 1.25 grams polyvinyl alcohol powder (0.00063 moles of 75% hydrolyzed polymer, approximately 2000 molecular weight). To the flask is added 15 grams oleic anhydride. The flask is stirred and heated to reflux at 218° C. for seven hours. After the contents of the flask cools to room temperature, the reaction product is dissolved in 200 mL toluene. A hundred mL water is added to this mixture and separated using a separatory funnel. The water layer is removed and tested with litmus. More water is added in 100 mL aliquots, and this procedure is repeated until the water layer is neutral to litmus paper. This requires between 5 to 10 washings.

The remaining toluene layer is transferred to a beaker and heated over moderate heat on a hot plate to evaporate the toluene. The beaker is then placed in a vacuum oven of 105° C. for twenty-four hours.

EXAMPLE 2

In this example, polyvinyl oleate for use in food compositions is synthesized from polyvinyl acetate.

A reaction flask is charged with 25 grams polyvinyl acetate resin (0.00357 moles of Rhodopas RB-1, a resin that meets the chemical identity standards listed in the Food Additive Regulation 21 C.F.R. 172.615, and has a molecular weight of approximately 7000). To the flask is added 100 grams 99% methyl oleate and 1.74 grams sodium. The flask is stirred and heated to reflux at 216° C.

EXAMPLE 3

This example describes an alternate polyvinyl oleate synthesis.

A reaction flask equipped with a magnetic stirrer, a thermometer, a dropping funnel, a nitrogen purge, and a reflux condenser is charged with 10 grams polyvinyl alcohol (molecular weight 2000, 75% hydrolyzed) and 115.68 grams phenol. The mixture is stirred, heated, and purged with nitrogen throughout the dissolution. At about 90° C., the polyvinyl alcohol begins to become soluble in the phenol, forming a clear yellow solution. After two hours between 100° and 130° C., practically all the polyvinyl alcohol is in solution.

The reflux condenser is then changed to a distillation apparatus, and 48.2 grams oleic acid is slowly added dropwise through the dropping funnel as phenol is distilled off over the course of about three hours. (Phenol which occasionally crystallizes in the condenser is melted with a heat gun.) During the course of the reaction, the temperature rises from 185° to 250° C. The mixture is left overnight.

The mixture is then reheated to 235° C. for two and a half hours under vacuum. The mixture changes from yellow to brown. About 115 grams of crude reaction product is recovered and further purified by step-wise separatory funnel extraction with three 120-mL aliquots of methanol. The (top) methanol layers extract color and are decanted and discarded, leaving a mustard-colored product which is vacuum dried to a clear brown viscous oil product.

EXAMPLE 4

This example outlines the procedure for estimating the in vitro digestibility of the polyvinyl esters of this invention.

Preparation of Reagents and Materials

1. Buffer: A pH 7.1 phosphate buffer is prepared by dissolving 6.8 g. $KH_2PO_4$ in 1 L. of millipore filtered water (to yield 0.05M phosphate). Fifty mg. $Ca(NO_3)_2$ and 5.0 g. cholic acid (Na salt, an ox bile isolate from Sigma) are added to give 300 microM $Ca^{++}$ and 0.5% cholic acid in 0.05M phosphate. The pH is adjusted to approximately 7.1 with solid NaOH. Several drops of Baker "Resi-analyzed" toluene are added to prevent bacterial growth during storage at 3-5° C.

2. Lipase: About 15 mg./mL commercial porcine pancreatic lipase from U.S. Biochemical Corporation is dissolved in buffer.

3. Substrates and Standards: A 1.0 mL volumetric flask is charged with an amount of lipid substrate (test substance or standard) calculated to give a concentration of 200 nanomoles per microliter in Baker "Resianalyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions. Fatty acids and glyceride standards from Nu Chek or Sigma are prepared for elution on TLC plates (prewashed with 1:1 chloroform/methanol) by diluting the substrate solution with 10:1 toluene (1 part substrate plus 9 parts toluene) in septum vials.

Procedure

In a 25 mL Erlenmeyer, emulsify 20 mL buffer (at room temperature) and 40 microliters of substrate using an ultrasonic disrupter at a microtip maximum setting for approximately 10 seconds. This results in a 0.4 micromole/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, for example, aliquots are taken at 10, 20, 30 and 40 minutes. A zero time control should be run for all test compounds.

Add the aliquot to a 15 mL glass centrifuge tube containing a drop of concentrated HCl. Add approximately 3 mL of a 2:1 mixture of $CHCl_3:CH_3OH$ and shake vigorously. Centrifuge at approximately 5000 rpm for about 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control, this amounts to 20 nanomoles of substrate spotted on the plate.) Develop with a suitable solvent system, such as, for example, hexane: ethyl ether: acetic acid in a ratio of 60:40:1. After 15 cm elution, dry plate with a heat gun and determine amounts of starting substrate and products of hydrolysis by scanning 10 to 20 nanomoles per channel at a wavelength of 190 nm using the CAMAG TLC Scanner II densitometer equipped with a Spectra Physics 4270 integrator and comparing with controls run at the same time.

Results

Using this procedure with polyvinyl oleate prepared in Example 3, no hydrolysis is observed after three hours contact with pancreatic lipase. Using a triglyceride control, triolein is substantially hydrolyzed in 10 minutes with this enzyme system.

EXAMPLE 5

Polyvinyl oleate prepared in Example 3 is used in a cookie recipe in this example.

The cookie dough is prepared by creaming together 23.11 grams fine granulated sucrose, 0.37 grams salt, 0.44 grams sodium bicarbonate, and 11.38 grams polyvinyl oleate. At this stage, no "foam" appears as with solid shortening during creaming. To this blend is added 3.74 grams distilled water and 5.87 grams 5.93% (wt/wt) dextrose solution, and then 39.10 grams flour. The dough is very tacky, and may be extruded or rolled out and cut before baking in the usual manner (e.g., at 400° Fahrenheit for 10 minutes). The tops of the cookies crack during baking.

EXAMPLE 6

Polyvinyl oleate prepared in Example 3 is used in a sprayed cracker recipe in this example.

A dough prepared from 100 parts flour, 5 parts sugar, 1.5 parts malt, 7.5 parts of the polyvinyl oleate prepared in Example 3, 1 part salt, 0.9 parts sodium bicarbonate, 2.5 parts non-fat dry milk, 2.5 parts high fructose corn syrup, 0.75 parts monocalcium phosphate, and 28 parts water is sheeted, stamped, sprayed with polyvinyl oleate from Example 3, and baked to produce a cracker product.

EXAMPLE 7

Polyvinyl oleate prepared in Example 3 is used as a frying oil in this example.

Standard packaged precut and frozen "French fried" potatoes are dropped into preheated polyvinyl oleate and fried at 325° to 375° F. for 8 to 10 minutes, or until golden.

The above descriptions are for the purpose of disclosing to a person skilled in the art how to practice the present invention. These are not intended to detail all the obvious modifications and variations of the invention which will become apparent upon reading. However, applicants do intend to include all such obvious modifications and variations within the scope of their invention which is defined by the following claims.

What is claimed is:

1. A process for synthesizing an edible fat product comprising:
    (a) dissolving molecular weight 500 to 8000 polyvinyl alcohol in a fatty acid anhydride in the absence of a solvent;
    (b) stirring and warming at reflux in the absence of a catalyst until the reaction is substantially complete; and
    (c) recovering the polyvinyl fatty acid ester thereby produced.

2. The process according to claim 1 wherein the fatty acid anhydride comprises a $C_{10}$ to $C_{22}$ fatty acid anhydride.

3. The process according to claim 2 which comprises a $C_{14}$ to $C_{22}$ unsaturated fatty acid anhydride.

4. The process according to claim 1 wherein the fatty acid anhydride is selected from the group consisting of those obtained from non-hydrogenated or hydrogenated soybean, safflower, sunflower, sesame, peanut, corn, olive, rice bran, canola, babassu nut, coconut, palm kernel, cottonseed, or palm oils.

5. The process according to claim 1 wherein the fatty acid anhydride is oleic anhydride.

6. A process for synthesizing an edible fat product comprising:
    (a) reacting molecular weight 500 to 8000 polyvinyl acetate with a fatty acid ester in the presence of an effective amount of a catalyst but in the absence of a solvent;
    (b) stirring and warming at reflux until the reaction is substantially complete; and (c) recovering the polyvinyl fatty acid ester thereby produced.

7. The process according to claim 6 wherein the fatty acid ester comprises a $C_{10}$ to $C_{22}$ fatty acid ester.

8. The process according to claim 7 wherein the fatty acid ester comprises a $C_{14}$ to $C_{22}$ unsaturated fatty acid ester.

9. The process according to claim 6 wherein the fatty acid ester is selected from the group consisting of those obtained from non-hydrogenated or hydrogenated soybean, safflower, sunflower, sesame, peanut, corn, olive, rice bran, canola, babassu nut, coconut, palm kernel, cottonseed, or palm oils.

10. The process according to claim 6 wherein the fatty acid ester is selected from the group consisting of methyl and ethyl oleate.

11. The process according to claim 6 wherein the catalyst is selected from the group consisting of sodium and a sodium-potassium alloy.

12. An edible fat product prepared by heating molecular weight 1000 to 5000 polyvinyl alcohol with an unsaturated fatty acid anhydride in the absence of a solvent or a catalyst.

13. The product of claim 12 wherein the fatty acid anhydride comprises a $C_{14}$ to $C_{24}$ fatty acid anhydride.

14. The produce of claim 12 wherein the fatty acid anhydride comprises cottonseed, peanut, olive, palm, sunflower, sesame, safflower, rice bran, soybean, and corn oil fatty acid anhydrides.

15. The product of claim 12 wherein the fatty acid anhydride is oleic anhydride.

16. An edible fat product prepared by heating molecular weight 1000 to 5000 polyvinyl acetate with an unsaturated fatty acid ester in the presence of a catalyst and in the absence of a solvent.

17. The product of claim 16 wherein the fatty acid ester comprises a $C_{14}$ to $C_{22}$ fatty acid ester.

18. The product of claim 16 wherein the fatty acid ester comprises cottonseed, peanut, olive, palm, sunflower, sesame, safflower, rice bran, soybean, and corn oil fatty acid esters.

19. The product of claim 16 wherein the fatty acid ester is selected from the group consisting of methyl oleate and ethyl oleate.

20. The product of claim 16 wherein the catalyst is selected from the group consisting of sodium and a sodium/potassium alloy.

21. An edible fat product prepared by heating low molecular weight polyvinyl acetate with methyl oleate in the presence of sodium and in the absence of a solvent.

22. An edible fat product prepared by heating low molecular weight polyvinyl alcohol with oleic anhydride in the absence of a catalyst and a solvent.

23. A process for preparing an edible synthetic fat replacement comprising:
  (1) admixing a low molecular weight polyvinyl alcohol with an unsaturated fatty acid derivative in the absence of a solvent;
  (2) heating and stirring the mixture in the absence of a catalyst until esterification reaction is substantially complete; and
  (3) separating the synthetic fat replacement thus formed.

24. The process of claim 23 wherein the low molecular weight polyvinyl alcohol comprises polyvinyl alcohol of molecular weights 1000 to 5000.

25. The process of claim 23 wherein the unsaturated fatty acid derivative is selected from the group consisting of unsaturated fatty acids, unsaturated fatty acid chlorides and unsaturated fatty acid anhydrides having a chain length of $C_{14}$ to $C_{24}$.

26. The process of claim 23 wherein the unsaturated fatty acid derivative is oleic anhydride.

27. The process of synthesizing an edible fat replacement comprising interesterifying a low molecular weight polyvinyl acetate with an unsaturated fatty acid ester in the presence of a catalyst and in the absence of a solvent.

28. The process of claim 27 wherein the unsaturated fatty acid ester comprises a $C_{14}$ to $C_{24}$ fatty acid ester.

29. The process of claim 27 wherein the low molecular weight polyvinyl acetate comprises molecular weight 500 to 8,000 polyvinyl acetate.

30. The process of claim 27 wherein the catalyst is selected from the group consisting of sodium and a potassium-sodium alloy.

31. An edible synthetic fat replacement comprising polyvinyl alcohol esterified in the absence of a solvent or a catalyst with a mixture of fatty acids obtained from the group consisting of cottonseed, peanut, olive, palm, sunflower, sesame, safflower, rice bran, soybean, and corn oils.

32. An edible synthetic fat replacement comprising polyvinyl oleate prepared in a solvent-free, catalyst-free esterification of polyvinyl alcohol.

* * * * *